June 7, 1938.   M. D. COULTER   2,120,021
PRESERVING BAKERY PRODUCTS
Filed Aug. 2, 1935
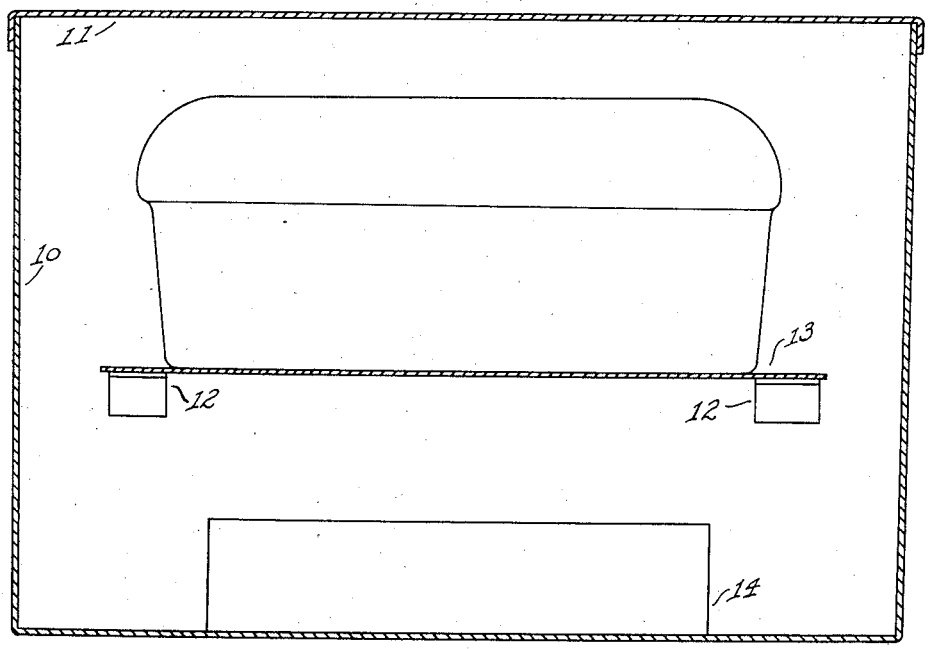
Fig. I
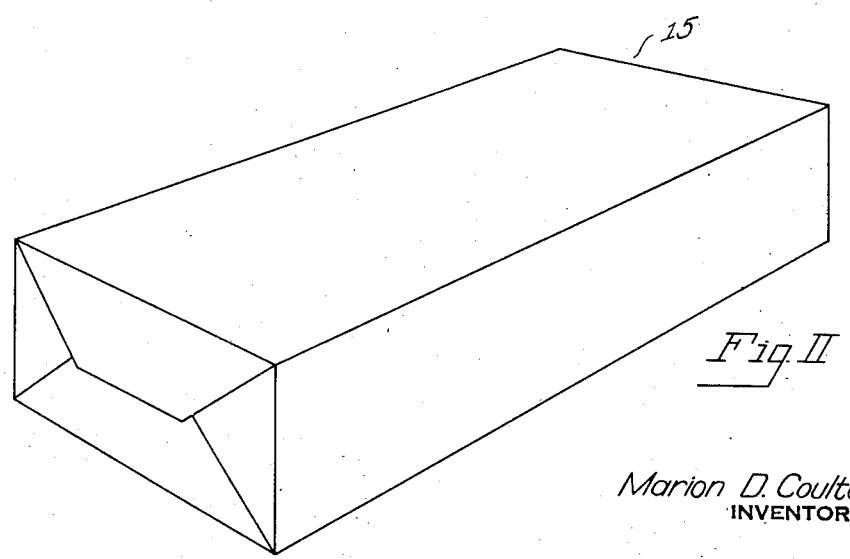
Fig. II
Marion D. Coulter
INVENTOR
BY
Gillson, Mann & Cox
ATTORNEYS Patented June 7, 1938

2,120,021

UNITED STATES PATENT OFFICE 2,120,021

PRESERVING BAKERY PRODUCTS

Marion D. Coulter, Pittsburgh, Pa., assignor to Toledo Scale Manufacturing Company, a corporation of New Jersey Application August 2, 1935, Serial No. 34,393

16 Claims. (Cl. 299—24)

The invention relates to preserving bakery products and other perishable goods and has for its principal object the preparation of units for treating the atmosphere of a storage cabinet containing a bakery product or the like.

Although research workers have studied the problem of spoilage of bakery products for many years, they have not been able in the past to reduce in any appreciable degree the quantity of bakery products wasted in the United States, amounting to millions of pounds every week. In the production of these products, it has been found impossible to prevent deposition of mold spores, which are universally present in the atmosphere, on the baked goods before they are wrapped.

The common mold spores require from three to seven days for incubation on bread enclosed in a wrapper or box. If, instead of spores, a particle of living mold is deposited on the loaf, active growth starts immediately. Mold does not develop on bread that is unwrapped and left to dry out in the open air, but the drying out of bread in the open air renders it unfit for food at the end of one or two days.

Changes in the condition of bread caused by molding or drying out, unlike the chemical change known as "staling", are not reversible, so that after they have occurred it is impossible to restore the bread to edible condition. No means has been known in the past for treating bread to prevent mold growth, without allowing it to dry out rapidly, or tainting it so much as to render it unsalable.

It has now been found, however, that molding of bakery products, particularly when uncut, can be prevented by the use, in conjunction with the maintenance of certain critical atmospheric conditions in the space where the products are stored, of agencies that have heretofore failed to inhibit such molding. Maintaining these critcal atmospheric conditions produces an increased effectiveness of anti-mold agencies that are not capable of tainting bread, and their increased effectiveness is such that they prevent molding. Under normal atmospheric conditions, these agencies are not effective to arrest mold growth.

In order to make effective the anti-mold agency that is employed, atmospheric conditions of temperature or relative humidity or both may be maintained within predetermined limits. Either temperature may be regulated while relative humidity is allowed to rise, or relative humidity may be regulated while temperature is allowed to vary with changes in weather. On the other hand, temperature and relative humidity may both be regulated, when neither needs to be kept as low as if temperature or relative humidity alone were controlled.

The most convenient mold-inhibiting agencies are substances that may be introduced into the atmosphere of the bakery product storage cabinet, which do not taint the products when present in contact with them in effective concentrations. Substances that do not taint the products in effective concentrations are hereinafter called palatable anti-mold agents.

Volatile palatable anti-mold agents are the most easily dispersed into the atmosphere of the storage space, particularly when they can be dissolved in a suitable solvent. One such agent is hydrogen peroxide, which can be obtained commercially as a 30% aqueous solution.

Ammonia when introduced into the atmosphere of the cabinet in a concentration not quite sufficient to taint bakery products is a particularly effective anti-mold agent. When an aqueous solution is used as the source of ammonia, the proportion of ammonia by weight is preferably about .005 or .01%. Concentrations less than .005% have not been found sufficiently effective under ordinary circumstances, while a concentration of .015% may impart an odor of ammonia to the products.

None of the agencies above mention has been found entirely satisfactory when used alone for the preservation of bakery products. However, when they are used in conjunction with the maintenance of predetermined critical atmospheric conditions in the storage space, bakery products particularly when uncut are satisfactorily preserved. The vital atmospheric conditions have been found to be temperature and relative humidity. Since the critical temperatures that correspond to various anti-mold agencies are relatively high, a mere tempering rather than refrigeration of the atmosphere in the storage space is required. Mold growth flourishes with equal abundance both above and below the critical temperatures corresponding to various anti-mold agencies, when such agencies are not used.

When an aqueous solution of ammonia having an ammonia concentration of .01% is left in contact with the atmosphere of the storage cabinet, and when the relative humidity of that atmosphere is close to 100%, the temperature in the cabinet need only be as low as 75° F., but a temperature of 80° F., has not proved satisfactory. The newly discovered properties of gaseous ammonia when used in the atmosphere of the storage space within a narrow range of concentrations are such that ammonia may be used alone for preservation when a temperature of 75° F. or less prevails. In other cases, it is necessary to provide means for maintaining proper atmospheric conditions.

Successful preservation may also be achieved by use of anti-mold agencies in conjunction with the maintenance of a per cent relative humidity that is below a predetermined critical value. In the majority of cases, a relative humidity of 81% is very satisfactory. Except when this value for relative humidity is used in conjunction with an anti-mold agency, it is of little avail, for a substantial growth of mold can be obtained both above and below 81% relative humidity in the absence of anti-mold agencies.

At 81% relative humidity, the rate at which the common varieties of bread lose water is not great enough to cause the bread to become seriously dried out for about a week. There is tabulated below the weight loss in percentage of the initial weight of samples of four types of bread, during exposure for various periods of time to 81% relative humidity.

| Period of exposure in hours | Loss in percentage of initial weight ||||
|---|---|---|---|---|
| | Cracked wheat | Rye | Home made | Soft bun |
| 20 | 0.2 | 0.8 | 1.4 | 2.0 |
| 43 | 1.3 | 2.0 | 2.6 | 4.0 |
| 67 | 2.1 | 3.1 | 4.1 | 6.1 |
| 92 | 3.2 | 5.1 | 8.4 | 9.0 |
| 116 | 4.6 | 7.9 | 11.6 | 11.6 |
| 163 | 8.2 | 12.0 | 17.0 | 15.0 |

It has been found that hard rolls and Vienna bread can be preserved at a relative humidity as low as 75%, although 81% relative humidity is not high enough to cause softening of their crust. Soft rolls cannot be preserved as long as other products because they dry out more rapidly. Cinnamon rolls, ordinary sweet rolls, cocoanut rolls and cake-batter doughnuts require a relative humidity below 80% in order to prevent their crusts from becoming sticky.

The two preferred palatable anti-mold agents that have been mentioned are soluble in water and are volatile, so that they may be conveniently introduced into the atmosphere of the storage space by use of an aqueous solution. The liquid comprising a volatile anti-mold agent may be an aqueous solution having a substantially constant vapor pressure, preferably in the range seventy-five to eighty-five per cent of the vapor pressure of water. Even when a solution of a volatile anti-mold agent with no other solute is used, a separate aqueous solution having the proper vapor pressure can be employed to maintain the desired relative humidity in the storage space. For this purpose, a sulphuric acid solution of about 25% concentration suffices, if brought into intimate contact with the atmosphere. However, a substantially saturated aqueous solution having a vapor pressure in the range seventy-five to eighty-five per cent of the vapor pressure of water is preferred, and an undissolved excess of solute in contact with the solution prevents it from becoming unsaturated. The relative humidity of air in equilibrium with such a saturated solution is caused to vary only about one per cent by annual variations in temperature occurring in ordinary temperate climates.

Saturated solutions of the following salts have been found satisfactory for maintaining in storage cabinets the relative humidities stated below.

| Salt used in saturated solution | Per cent relative humidity at 20° C. |
|---|---|
| Sodium acetate $NaC_2H_3O_2.3H_2O$ | 76.0 |
| Sodium thiosulphate $Na_2S_2O_3.5H_2O$ | 78.0 |
| Ammonium chloride $NH_4Cl$ | 79.2 |
| Ammonium sulphate $(NH_4)_2SO_4$ | 81.0 |

Substantially stable ammonium salts of strong mineral acids are preferred because the vapor pressure of their saturated aqueous solutions is best suited to most bakery products. In addition, they appear to act to some extent as mold-inhibiting agents. It is believed that the slight volatilization and dissociation of these salts provides ammonia in effective concentrations. Ammonium sulphate is cheaper than ammonium chloride, has a slightly more desirable vapor pressure, and has been found to have a greater inhibiting effect upon the growth of bread mold.

Successful protection of bakery products against mold growth has been attained by use of a solution prepared from ammonium sulphate and hydrogen peroxide. After aqueous solutions of the two compounds have been mixed gradually in a cooled vessel, the resulting solution is relatively stable. It is believed to contain two definite compounds, in one of which a molecule of ammonium sulphate is combined with a molecule of hydrogen peroxide, and in the other of which two molecules of ammonium sulphate are combined with a molecule of hydrogen peroxide.

During an experiment that lasted for 129 hours, the solution prevented mold growth on the exterior of loaves of rye, cracked wheat, home made and soft bun bread stored in an atmosphere exposed thereto. The stability of the preserving solution thus appears to be such that hydrogen peroxide continues to be set free for ten days or more instead of disappearing rapidly as it does in a solution of hydrogen peroxide alone.

The proportions of ammonium sulphate and hydrogen peroxide used in the preserving solution should be such that there is always an undissolved excess of ammonium sulphate. If 139 parts of 30% hydrogen peroxide solution are mixed with a solution of ammonium sulphate containing 103 parts of water, there should be present at least 162 parts of ammonium sulphate. The combining of ammonium sulphate and hydrogen peroxide appears to go on very slowly so that the excess of undissolved ammonium sulphate disappears gradually. When only 162 parts of ammonium sulphate are used with the proportions of other ingredients stated above, the undissolved ammonium sulphate all passes into solution in the course of about 67 hours, and the vapor pressure of the solution then falls below the value that it is desirable to maintain in the storage space in order to prevent rapid drying of the bakery products.

Preserving solutions may also be made up from ammonium sulphate and ammonia, or ammonium sulphate, hydrogen peroxide and ammonia. When ammonium sulphate and ammonia are used, the proportion of ammonium sulphate should be sufficient to saturate the solution, and the ratio of the weight of ammonia to the weight of water should be about .0001 or slightly less. It has been found that mold growth on stored bakery products is prevented by solutions in the storage space saturated with ammonium sulphate and containing ammonia and hydrogen peroxide with concentrations of ammonia and hydrogen peroxide varying over a wide range, the ratio of the weight of ammonia to the weight of water being below .00015 in all cases in order that tainting of the products may be avoided.

After a loaf of bread is removed from its wrapper by a consumer, the mold spores incubating on the loaf at once become greatly augmented by deposition of spores from the unfiltered air of the home. In an experiment in which a loaf of bread was unwrapped and then replaced inside the wrapper with the opened end of the wrapper folded shut in the usual manner, luxuriant mold growth began to appear at the end of five days. A high relative humidity was maintained inside the wrapper by evaporation of moisture from the bread in this case as in the case of all wrapped bread. Yet the surrounding air was very dry and at a temperature below 75° F. It is thus apparent that bakery products can be preserved far better than by prior practices when treated in accordance with the methods above described, and that there is great need for a device suitable for use in the home to carry out these methods of preserving bakery products.

Although the mold-inhibiting agencies most convenient for domestic use are liquids comprising palatable volatile anti-mold agents, trays of such liquids for domestic bread boxes are awkward to handle and are likely to be spilled frequently. The use of the preserving liquids in the home is made feasible, in accordance with the present invention, by rigidification of the liquids into solid units that can be handled in the home with convenience and that obviate all danger of spilling of the liquids.

A method of rigidifying these and other liquids has been discovered that can be carried out by the addition to them of a relatively small proportion of supporting or rigidifying ingredients. It has also been found that the units of the present invention can be so stabilized that they can be stored and kept in their original condition until they are needed. After a stabilized unit made in accordance with the invention has been unstabilized and placed in a closed bread box, it gives off and absorbs vapors for a month or more to maintain therein the conditions necessary for preservation of bakery products.

The principal object of the invention is thus the preparation of units of rigidified liquid for treating the atmosphere of a storage cabinet containing a bakery product or the like. More specific objects and advantages are apparent from the description, in which reference is had to the accompanying drawing illustrating units made in accordance with the invention.

Figure I of the drawing is a vertical section of a storage cabinet for preservation of a bakery product by means of a unit made in accordance with the invention.

Figure II illustrates a unit stabilized in accordance with the invention.

This specific drawing and the specific description that follows are to disclose and illustrate the invention and are not to impose limitations upon the claims.

There is shown in Figure I of the drawing a closed cabinet for a bakery product adapted to hold a unit of the type mentioned above. The cabinet may be in the form of a box 10 having an air-tight cover 11, and brackets 12 fixed to the inside wall of the box for supporting a shelf 13. A unit 14 may be placed in the bottom of the box.

In the preparation of the unit, the rigidifying ingredients added to the preserving liquid may include absorbent material and a quantity of binder that holds the absorbent material in a coherent mass without materially impairing its absorbent properties. The former substance is preferably in the form of particulate material such as granular or earthy matter. Among the suitable materials are various commercial filter aids, and particularly diatomaceous earth, which can be obtained as a crude gray or purified white product.

When an absorbent particulate material is used, the particles may be impregnated with a substantial proportion of liquid and then bound together into a coherent solid mass. It has been discovered that a remarkably large proportion of liquid can be incorporated into a unit prepared in that manner, although in a unit that is first made up from comparatively dry materials into a brick and then impregnated with liquid, only a small proportion of impregnating liquid can be retained.

The quantity of binder used is preferably smaller than the quantity of absorbent material, because any increase in the proportion of binder produces some obscure change in the texture of the finished unit, believed to be a clogging of the pores, which causes a loss of part of the liquid by drainage.

The preserving liquid may also be rigidified by mixing any suitable self-setting absorbent material therewith. For the self-setting material there may be used a mixture comprising an absorbent substance, such as a mixture of absorbent matter with a self-setting binder. The most suitable self-setting binders are cements such as plaster of Paris, gypsum plaster, lime and Portland cement. Since plaster of Paris is a less dense cement than the others, it does not clog up the absorbent material in the unit as much. When plaster of Paris is used as the binder and diatomaceous earth as the absorbent material, it has been found that the ratio by weight of plaster of Paris to diatomaceous earth should be about 1:3.

Whatever the liquid used in the unit, the weight thereof may be substantially greater than the weight of absorbent material, and even greater than the combined weight of the rigidifying ingredients. If the liquid constitutes a solution, it may contain a quantity of solute approximately sufficient to form a saturated solution. Thus there may be a slight undissolved excess of solute, provided for the purpose of keeping the solution saturated, as in the case of the use of a saturated solution having a definite vapor pressure. In the preparation of the unit, a mixture of the excess of solute with self-setting absorbent material holding the saturated solution may be made.

For use in a bread storage cabinet that may be left closed for comparatively long periods of time, a unit is recommended that is made up from the following ingredients in the proportions stated:

| | Parts |
|---|---|
| Diatomaceous earth | 15.0 |
| Plaster of Paris | 5.0 |
| Ammonium sulphate | 47.5 |
| Water | 50.0 |

In the above formula the weight of the ingredients used to rigidify the ammonium sulphate solution is only about one-fourth the weight of the solution. The formula provides a considerable excess of ammonium sulphate over the amount required for a saturated solution, so that a unit made in accordance with the formula is capable of absorbing moisture from bakery products in a closed cabinet for a longer period of time than the cabinet is likely to remain closed, before the ammonium sulphate solution can become unsaturated. Thus, since the solution does not become unsaturated in the ordinary use of the unit, the relative humidity in the cabinet cannot rise above 81% during any period for which the cabinet remains closed. If there is no danger that during the use of the unit its water content may become greater than it was when the unit was made, then the weight of ammonium sulphate used may be only about enough to saturate the water, or approximately three-fourths of the weight of water.

After the above ingredients have been mixed thoroughly, it requires about two and one-half minutes for them to set into a unit firm enough for removal from a mold. Large batches of material may be mixed up at one time in order to reduce the rate of setting. Anti-mold agents such as hydrogen peroxide and ammonia may be incorporated with the ammonium sulphate solution in the unit in the manner described at the beginning of the specification.

In case a unit large enough for a cabinet holding four loaves of bread is desired, the total weight of ingredients used should be sufficient to make a unit weighing about 400 grams and having a volume of about 80 cubic inches. In that case, the proportion of plaster of Paris may be increased about 9% over the proportion stated in the formula in order to prevent the unit from being soft in the larger size.

There are tabulated below the results of an experiment in which a number of units were made up from ingredients in proportions that were the same as in the formula except that instead of 5 parts of plaster of Paris, the proportion of plaster of Paris stated in the table was used for each unit.

| Parts plaster of Paris | Character of unit |
| --- | --- |
| 1.0 | Heavy drainage. Did not set in two hours. |
| 2.5 | Small drainage loss. Remained soft and lost shape when removed from mold. |
| 4.0 | No drainage. Soft out of mold. Lost shape slightly. |
| 4.5 | No drainage. Held shape. |
| 5.5 | Slight drainage. Held shape. |
| 6.0 | Drainage increased. Set in 140 seconds. |
| 6.5 | Drainage increased. Held shape out of mold. Set almost immediately on pouring into mold. |

The tabulated results show that the use of a proportion of plaster of Paris greater than that recommended causes loss of solution by drainage and undesirably great rapidity of setting. In another experiment several units were made up that were prepared according to the formula except that instead of 50 parts of water and 47.5 parts of ammonium sulphate, the proportions of water and ammonium sulphate stated in the table were employed for each unit.

| Parts (NH₄)₂SO₄ | Parts H₂O | Character of unit |
| --- | --- | --- |
| 30 | 30 | Broke on removal from mold. Set quickly. |
| 35 | 35 | Broke on removal from mold. Set quickly. |
| 40 | 40 | Slightly friable but could be handled. |
| 45 | 45 | Satisfactory. |
| 50 | 50 | Satisfactory. |
| 55 | 55 | Too soft but came from mold without breaking. |
| 60 | 60 | Too soft to handle. |
| 65 | 65 | Too soft to handle. |

Although the time required for setting of the units prepared in this experiment did not vary greatly with varying proportions of solution, the experiment showed how much solution can be used in the unit, and showed that when less than the maximum proportion of solution is used some ingredients should be included to counteract friability of the unit.

It has been discovered that in all cases, during the casting of the unit, a slight amount of the contained liquid may drain into the bottom of the mold. Thus it is advantageous to use a mold having a perforated bottom in order to prevent the finished unit from having an undesirably soft lower portion.

When the preserving liquid to be rigidified is a solution, it is quite advantageous to dissolve in the solvent at a suitable temperature an amount of the solute that is in excess of the amount that dissolves in the solvent at ordinary temperatures, in order to prepare the solution for incorporation in a self-setting absorbent mass. A solution so prepared can be filtered while it is at a temperature at which all the solute is dissolved, and in addition, the solution is certain to be saturated after the unit has been cast. If the solution is allowed to stand so that part of the solid material precipitates, the precipitate is very fine and settles slowly so that it is very easily mixed with the other ingredients at the same time as the solution. An ammonium sulphate solution, when used in making up the unit, can be prepared by heating the salt with the water until the increased solubility is such that all of the salt dissolves.

It has also been found that an advantageous way to make the unit is to prepare a substantially uniform batch comprising the self-setting material and another substantially uniform batch comprising the liquid, and then to form the unit by mixing the two batches. In that way the self-setting material is intimately mixed while dry, before the liquid is added, so that there is sufficient time for pouring the final mixture before it sets. The most satisfactory formulas for the unit have been found to give mixtures that set with unusual rapidity. In the preparation of the batch comprising the liquid, it is desirable to include all solutes that are to be dissolved in the liquid, in order that the dissolving may take place before setting of the unit has occurred.

Thus when the unit is made in accordance with the formula stated above, the preferred procedure is to mix the diatomaceous earth intimately with the plaster of Paris, to dissolve the ammonium sulphate in the water by use of heat, to filter the hot solution, and then to add the solid ingredients slowly to the filtered solution with stirring. After about three minutes of stirring, the mixture is stiff enough so that it can be poured into a mold having a bottom formed of copper screen or other suitable perforate material. When the mold is made of wood, and preferably also when it is made of steel, it should be lubricated to prevent sticking of the unit.

It has been discovered that when the units are wrapped in one of the many varieties of moisture-proof foil on the market, such as "Cellophane" or "Kodapak", the foil does not promote deposition of salt on the exterior of the units, and is not attacked by the ammonium sulphate used in the preferred form of unit. The stabilized unit 15 illustrated in Figure II is preferably prepared after the cast mixture has cooled, because units wrapped while warm develop a slight odor that requires a few minutes after opening of the stabilized unit for its disappearance. Experiments have shown that units stabilized according to the invention remain in their original condition for an indefinite period of time, so that they can be kept in storage until it is desired to use them.

After the foil has been removed and the unit placed in a closed cabinet, it at once begins to give off and absorb vapors so that the exact atmospheric conditions necessary for preservation of bakery products are maintained.

The substance of the invention may be utilized in making up units in various ways to meet various requirements.

I claim as my invention:

1. A unit for treating the atmosphere of a storage cabinet comprising an absorbent granular substance cemented into a coherent mass and holding a solution, and a slight undissolved excess of a solute for preventing substantial fluctuation of the vapor pressure of the solution.

2. A unit for treating the atmosphere of a storage cabinet comprising a quantity of diatomaceous earth, a quantity of plaster of Paris whose weight is approximately one-third of the weight of the earth, and a quantity of water whose weight is substantially greater than the weight of the earth.

3. A method of making a unit for treating the atmosphere of a storage cabinet that includes impregnating absorbent particles with a water solution, and binding them together in a coherent solid mass with a cement, the amount of solution used being such that a major proportion of the weight of the finished unit consists of free liquid.

4. A method of making a unit for a storage cabinet that includes impregnating a quantity of absorbent particulate material with a water solution for treating the atmosphere of the cabinet, and binding said quantity of absorbent particulate material into a coherent mass with a smaller quantity of a cement, the amount of solution used being such that a major proportion of the weight of the finished unit consists of free liquid.

5. A method of making a unit for a storage cabinet that includes preparing a self-setting mixture comprising an absorbent particulate substance, a cement, and such an amount of water for treating the atmosphere of the cabinet that a major proportion of the weight of the finished unit consists of free water.

6. A method of making a unit for a storage cabinet that comprises preparing a mixture of absorbent particulate material, holding a saturated water solution of a water soluble substance, with a cement and an undissolved excess of said substance to maintain a constant partial pressure of water in the atmosphere of the cabinet, the amount of solution being such that it makes up a major proportion of the weight of the finished unit.

7. A method of making a unit for a storage cabinet that comprises preparing a mixture comprising absorbent particulate material such an amount of water that a major proportion of the weight of the finished unit consists of free water, and casting the mass in a mold having a perforate bottom.

8. A method of making a unit for a storage cabinet that comprises preparing a mixture containing diatomaceous earth, a cement, and such an amount of a water solution that a major proportion of the weight of the finished unit consists of free water, and casting the mixture in a mold having a perforate bottom.

9. A method of making a unit for a storage cabinet that comprises preparing a mixture containing a quantity of diatomaceous earth, a smaller quantity of plaster of Paris, and such a quantity of water that a major proportion of the weight of the finished unit consists of free water, and casting the mixture in a mold having a perforate bottom.

10. A method of making a unit for a storage cabinet that includes dissolving in water, at a temperature at which such an amount will dissolve, an amount of water soluble material that is in excess of the amount that dissolves in water at ordinary temperatures, and incorporating, in a mixture of absorbent particulate material and a cement, such an amount of the resulting product that a major proportion of the weight of the finished unit consists of solution.

11. A method of making a unit for a storage cabinet that includes dissolving in a substantial quantity of water, at a temperature at which such an amount will dissolve, an amount of water soluble material that is in excess of the amount that would dissolve at ordinary temperatures, filtering the resulting solution while said material remains dissolved, and incorporating with a mixture of a cement and absorbent particulate material such an amount of the resulting product that a major proportion of the weight of the finished unit consists of solution.

12. A method of making a unit for a storage cabinet that includes preparing a mixture of absorbent particulate material with a cement, preparing a batch comprising such a quantity of water that a major proportion of the weight of the finished unit consists of free water, and then forming the unit by mixing said batch with said mixture.

13. A method of making a unit for a storage cabinet that includes preparing a substantially uniform batch comprising a cement and absorbent particulate material, and another batch comprising water in which has been dissolved, at a temperature at which such an amount will dissolve, an amount of water soluble material that is in excess of the amount that would dissolve at ordinary temperatures, and then forming the unit by mixing the two batches, the amount of solution used being such that it makes up a major proportion of the weight of the finished unit.

14. A unit for treating the atmosphere of a storage cabinet comprising a quantity of absorbent particulate material impregnated with free water, and then cemented into a coherent mass with a smaller quantity of a cement, the amount of water being such that it makes up a major proportion of the weight of the finished unit.

15. A unit for treating the atmosphere of a storage cabinet including a quantity of diatomaceous earth impregnated with a water solution, and then cemented into a coherent mass with a smaller quantity of a cement, the amount of solution being such that it makes up a major proportion of the weight of the finished unit.

16. A unit for treating the atmosphere of a storage cabinet comprising absorbent particulate material impregnated with free water, and then cemented together with a quantity of a cement that holds said material in a coherent mass without materially impairing its absorbent properties, the amount of water being such that it makes up a major proportion of the weight of the finished unit.

MARION D. COULTER.

CERTIFICATE OF CORRECTION.

Patent No. 2,120,021. June 7, 1938.

MARION D. COULTER.

It is hereby certified that error appears in the printed specification of the above numbered patent requiring correction as follows: Page 5, first column, line 58, claim 7, after "material" insert the comma and words ", a cement, and"; and that the said Letters Patent should be read with this correction therein that the same may conform to the record of the case in the Patent Office Signed and sealed this 19th day of July, A. D. 1938.

(Seal)

Henry Van Arsdale,
Acting Commissioner of Patents.